(12) United States Patent
Yu et al.

(10) Patent No.: US 10,781,964 B2
(45) Date of Patent: Sep. 22, 2020

(54) DISPLAYER BASE WITH DISPLAYER ELEVATING DEVICE

(71) Applicants:HONG FU JIN PRECISION INDUSTRY (WuHan) CO., LTD., Wuhan (CN); HON HAI PRECISION INDUSTRY CO., LTD., New Taipei (TW)

(72) Inventors: Long Yu, Wuhan (CN); Liang-Chin Wang, New Taipei (TW); Yu-Cheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 63 days.

(21) Appl. No.: 16/004,235

(22) Filed: Jun. 8, 2018

(65) Prior Publication Data

US 2019/0203875 A1    Jul. 4, 2019

(30) Foreign Application Priority Data

Dec. 29, 2017  (CN) .......................... 2017 1 1481286

(51) Int. Cl.
*F16M 11/26* (2006.01)
*F16M 11/42* (2006.01)
*F16H 25/20* (2006.01)
*F16H 1/16* (2006.01)

(52) U.S. Cl.
CPC ............. *F16M 11/26* (2013.01); *F16H 25/20* (2013.01); *F16M 11/42* (2013.01); *F16H 1/16* (2013.01); *F16H 2025/204* (2013.01); *F16H 2025/209* (2013.01)

(58) Field of Classification Search
CPC ........ F16M 11/26; F16M 11/42; F16M 11/28; F16H 25/20; F16H 1/16; F16H 2025/204; F16H 2025/209; A47B 9/04; A47B 2009/043; A47B 2009/046; A47B 9/12; A47B 9/20; A47B 13/081
USPC ........................ 248/422, 919–923, 157, 421, 248/125.1–125.2, 125.8–125.9
See application file for complete search history.

(56) References Cited

U.S. PATENT DOCUMENTS 2,512,068 A * 6/1950 Mayo ....................... A41H 9/02
33/10
5,489,938 A * 2/1996 Maruyama ............... H04N 5/64
312/223.3

(Continued)

*Primary Examiner* — Christopher Garft
(74) *Attorney, Agent, or Firm* — ScienBiziP, P.C.

(57) ABSTRACT

A base device which can raise or lower a display panel suspended therein includes a fixing frame, a hanger for fixing the panel, two sliding rods, a connecting seat, a driving device, and a screw rod. The fixing frame includes two fixing rods spaced apart from each other and a base connected between the two fixing rods. The two sliding rods are connected to the hanger and slidably fixed to the two fixing rods. The connecting seat is fixed between the two sliding rods. The screw rod is fixed on the base. The driving device is fixed on the connecting seat and slidably connected to the screw rod. When the driving device is moved, manually or by motor, up and down along the screw rod the hanger carrying the panel is lifted up or lowered.

9 Claims, 6 Drawing Sheets

(56) References Cited

U.S. PATENT DOCUMENTS

| | | | | |
|---|---|---|---|---|
| 6,604,722 B1* | 8/2003 | Tan | ............... | F16M 11/10 |
| | | | | 248/276.1 |
| 6,679,631 B2* | 1/2004 | Iida | ............... | F16C 29/045 |
| | | | | 384/55 |
| 2005/0045077 A1* | 3/2005 | Bober | ............... | B66F 9/02 |
| | | | | 108/147 |
| 2005/0109892 A1* | 5/2005 | Bober | ............... | F16M 11/30 |
| | | | | 248/125.2 |
| 2006/0238086 A1* | 10/2006 | Lai | ............... | F16M 11/18 |
| | | | | 312/319.5 |
| 2007/0152112 A1* | 7/2007 | Bober | ............... | F16M 11/18 |
| | | | | 248/125.2 |

* cited by examiner

DISPLAYER BASE WITH DISPLAYER ELEVATING DEVICE

FIELD

The subject matter herein generally relates to movable displays.

BACKGROUND

Display devices are used in various places and can be fixed on a wall. When a height of the displayer is to be adjusted, the displayer is needed to be disassembled and then installed at the new height, which is inconvenient.

BRIEF DESCRIPTION OF THE DRAWINGS

Implementations of the present technology will now be described, by way of example only, with reference to the attached figures.

DETAILED DESCRIPTION

Figure 1:
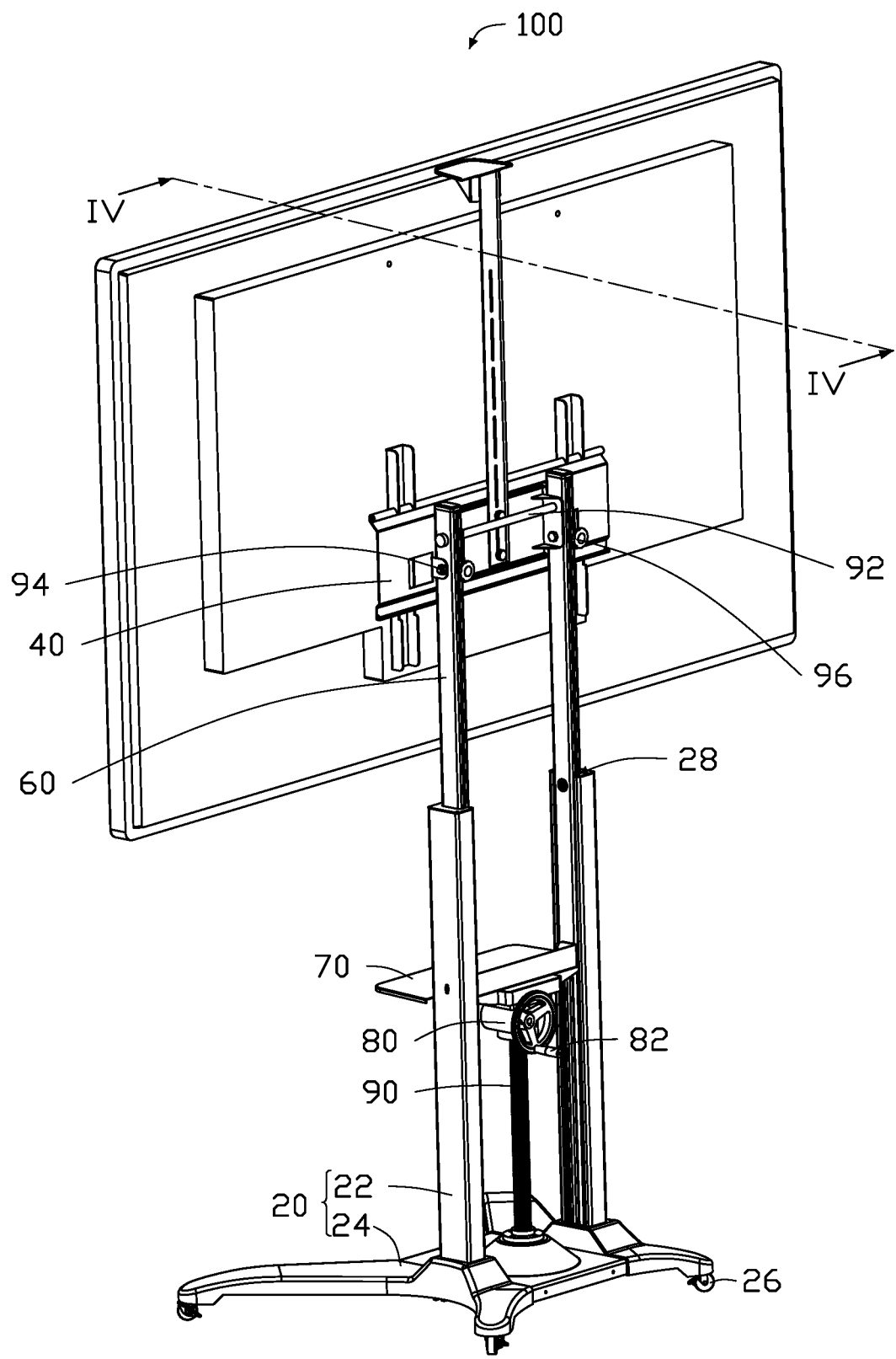
FIG. 1 is an isometric view of an embodiment of a displayer elevating device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" means "including, but not necessarily limited to"; it specifically indicates open-ended inclusion or membership in a so-described combination, group, series, and the like.

Figure 2:
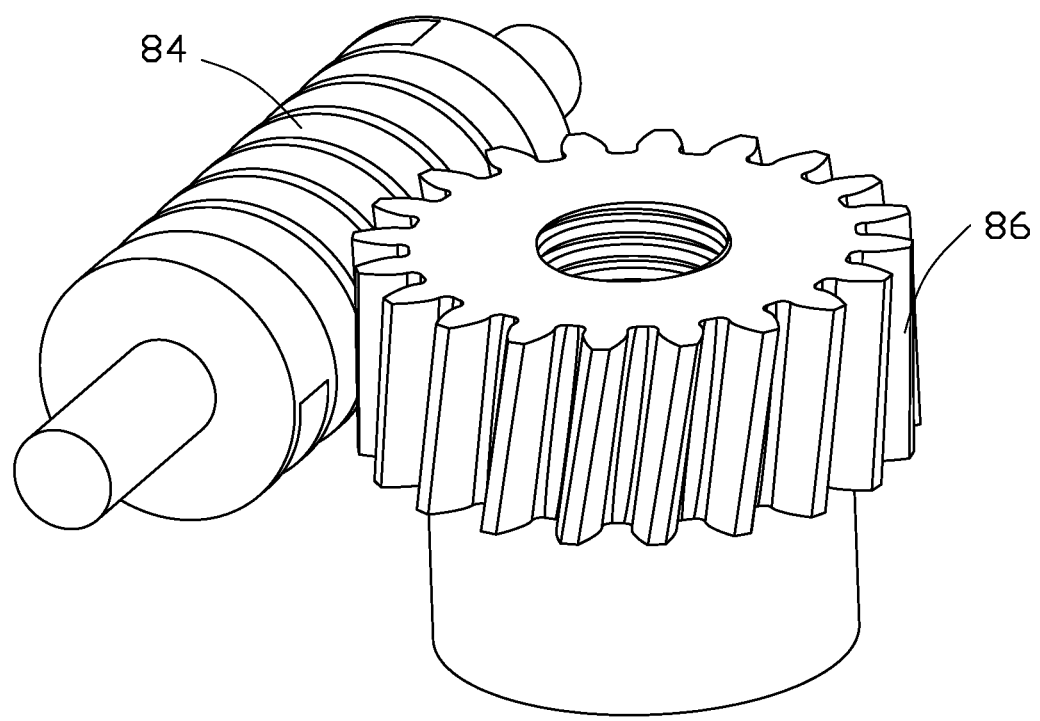
FIG. 2 is an isometric view of a driving device of the displayer elevating device in
FIG. 1.
Figure 3:
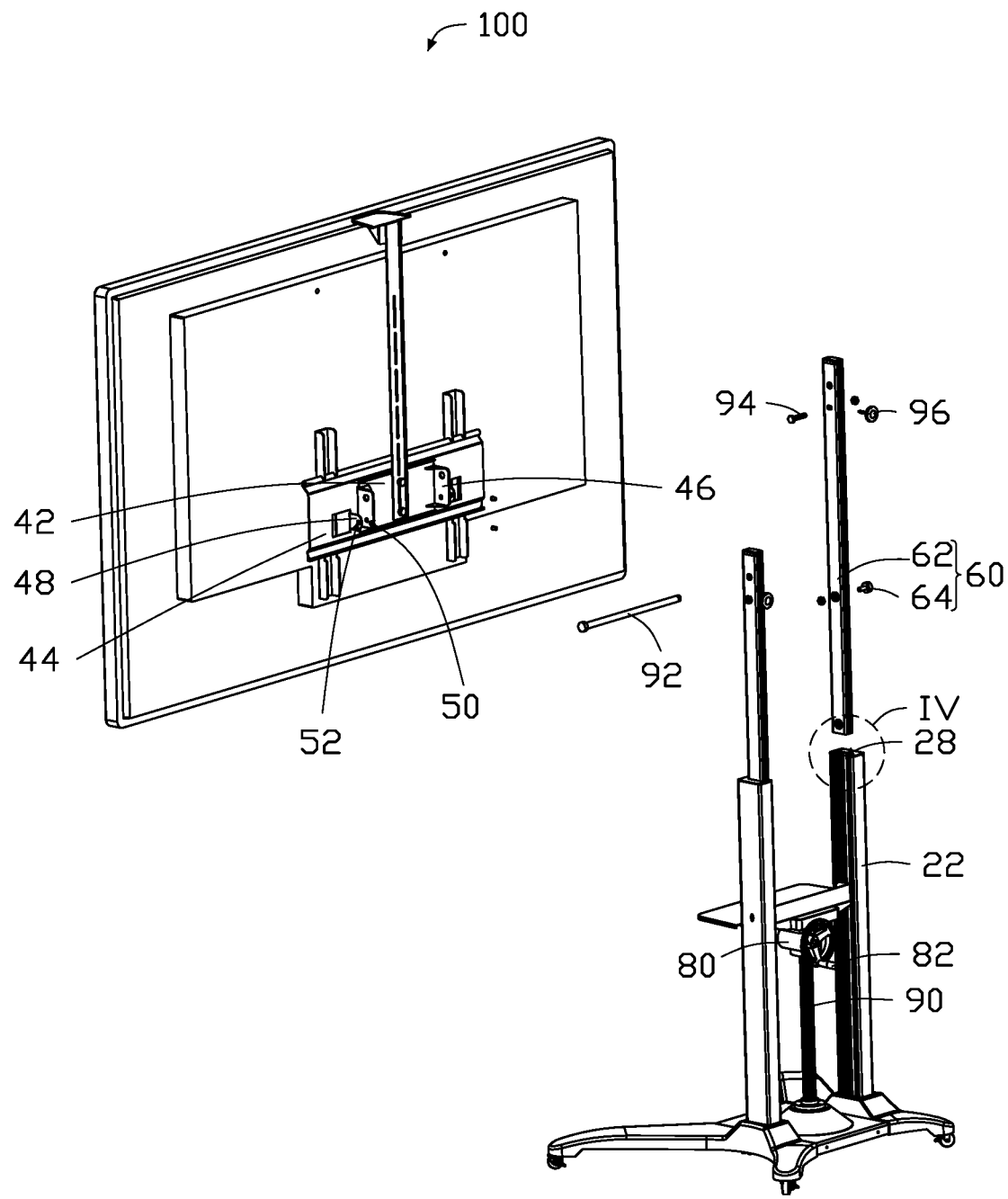
FIG. 3 is an exploded isometric view of the displayer elevating device of FIG. 1.
Figure 4:
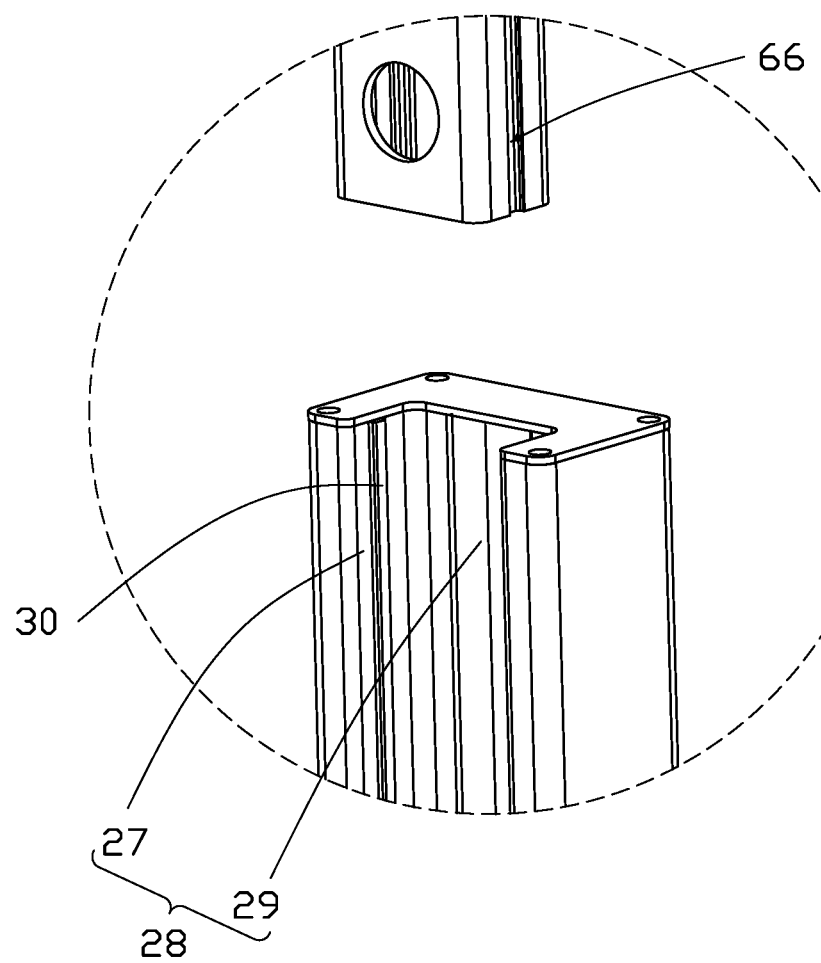
FIG. 4 is a view of the circular section IV of the displayer elevating device in FIG. 3.
Figure 5:
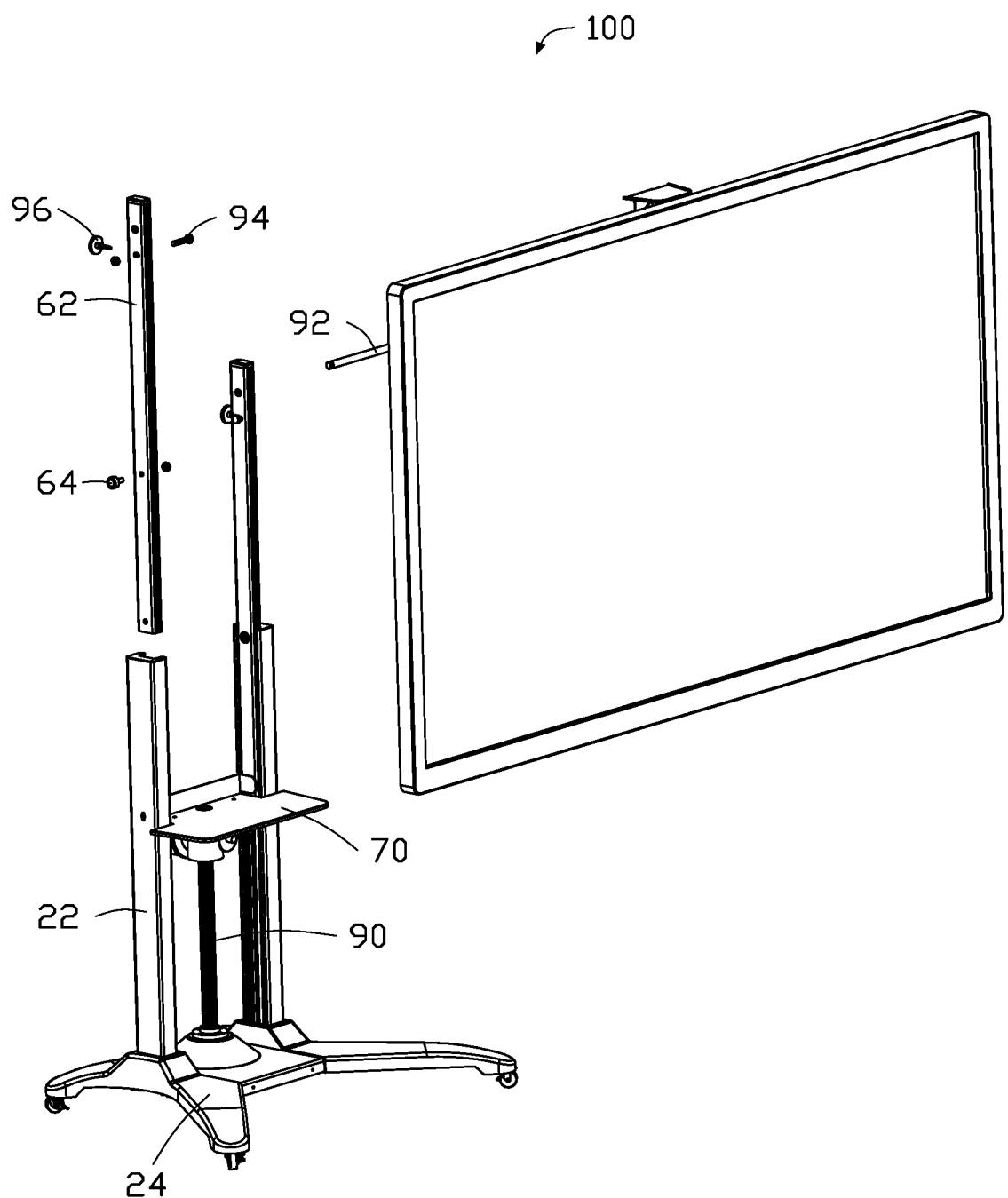
FIG. 5 is similar to FIG. 1, but showing the displayer elevating device in another state.
Figure 6:
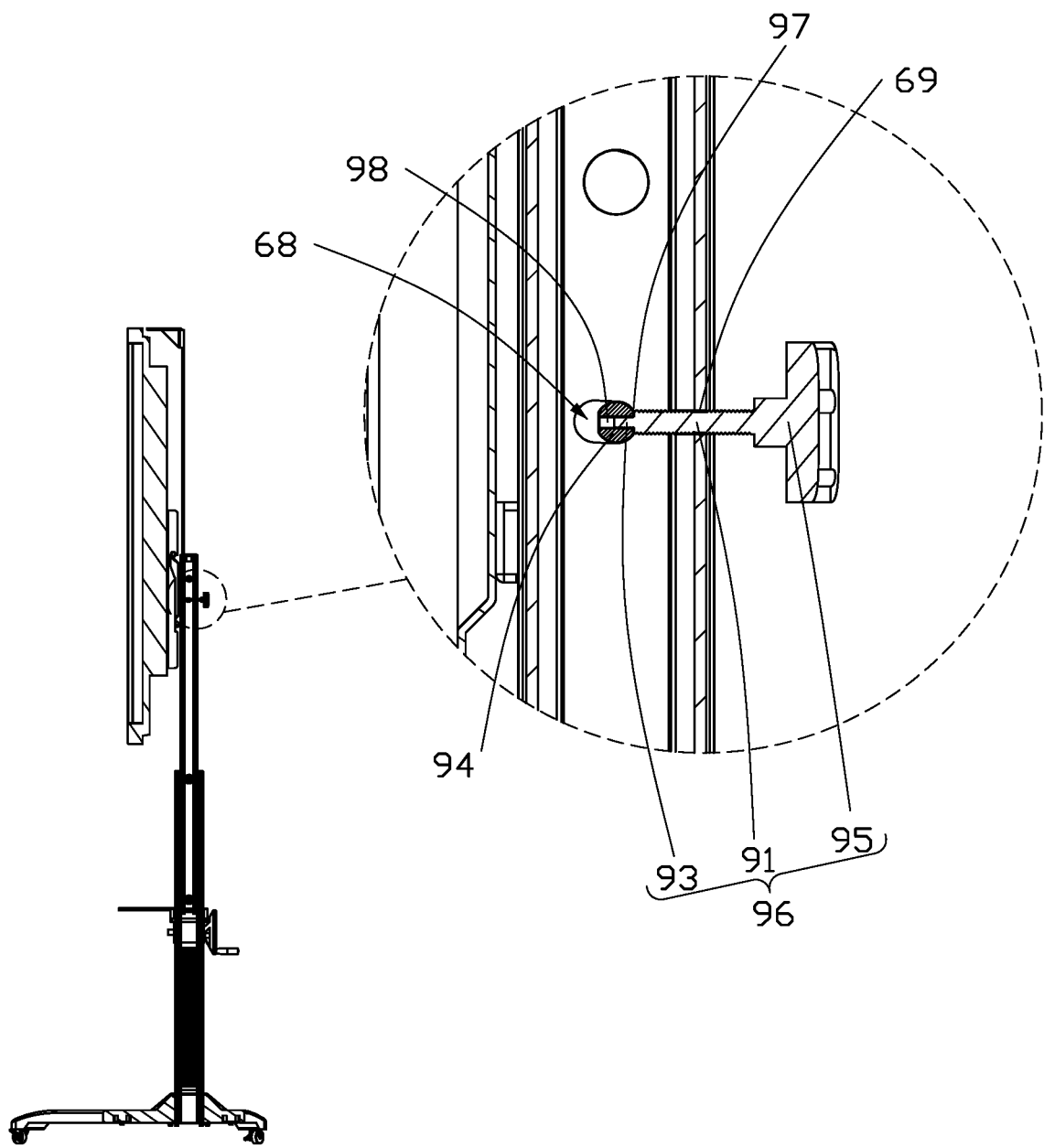
FIG. 6 is a cross-sectional view taken along the line IV-IV of FIG. 1.

FIG. 1 to FIG. 6 illustrate a displayer elevating device 100. The displayer elevating device 100 includes a fixing frame 20 and a hanger 40 for fixing a displayer. The fixing frame 20 includes two fixing rods 22 spaced apart from each other and a base 24 connected between the two fixing rods 22. The display elevating device 100 further includes two sliding rods 60, a connecting seat 70, a driving device 80, and a screw rod 90. The two sliding rods 60 are connected to the hanger 40 and slidably fixed to the two fixing rods 22. The connecting seat 70 is fixed between the two sliding rods 60. The screw rod 90 is fixed on the base 24. The driving device 80 is fixed on the connecting seat 70 and slidably connected to the screw rod 90. When the driving device 80 is moved up and down along the screw rod 90 the sliding rods 60 slide along the fixing rod 22 so that the hanger 40 and displayer is lifted up and down.

The driving device 80 is a lifting hand wheel. The lifting hand wheel includes a rotating wheel 82, a worm 84 fixed to the rotating wheel 82, and a first worm gear 86 meshing with the worm 84. The first worm gear 86 is sleeved on the screw rod 90 and screwed on the screw rod 90. When the rotating wheel 82 is rotated in a first direction, the first worm wheel 86 drives the connecting seat 70 to slide upwards along the screw rod 90 so that the displayer moves upward. When the rotating wheel 82 is rotated in a second direction, the first worm wheel 86 drives the connecting seat 70 to slide downwards along the screw rod 90 so that the display moves downward.

In another embodiment, the driving device 80 includes a control switch, a motor, and a controller. The control switch and the motor are electrically connected to the controller. The control switch and the controller are disposed on the base 24. The controller controls the turning and stopping of the motor according to the control switch. The motor includes a rotating shaft and a second worm wheel. A worm gear tooth is formed outside the rotating shaft, and the worm gear tooth meshes with the second worm gear. The second worm gear is sleeved on the screw rod 90 and screwed on the screw rod 90.

The base 24 includes at least three universal casters 26. In the embodiment, the base 24 includes four universal casters 26. The display elevating device 100 can be moved across the floor through the universal casters 26.

Each fixing rod 22 defines a sliding slot 28. Two sliding slots 28 of the two fixing rods 22 face each other. The two sliding rods 60 are slidably disposed in the two sliding slots 28. Each sliding slot 28 includes a first sliding slot 27 and a second sliding slot 29 communicating with the first sliding slot 27. Each sliding rod 60 includes a rod body 62 and a number of rollers 64 fixed to the rod body 62. The rod body 62 is disposed in the first sliding slot 27, and the roller 64 is disposed in the second sliding slot 29. A diameter of the roller 64 is smaller than a width of the rod body 62. Two ribs 30 protrude from opposite edges of each first sliding slot 27. Each rod body 62 defines two guiding grooves 66 on opposite sides of the rod body 62. The two ribs 30 are slidably disposed in the two guiding grooves 66.

The displayer elevating device 100 further includes a first shaft 92, a second shaft 94, and two adjusting members 96. The hanger 40 is rotatably connected to the sliding rod 60 via the first shaft 92. The sliding rod 60 defines an adjusting hole 68 and a fixing hole 69. The second shaft 94 defines a receiving hole 98. The second shaft 94 is fixed to the hanger 40 and is movably disposed in the adjusting hole 68. One end of the adjusting member 96 passes through the fixing hole 69 and is fixed in the receiving hole 98. When the adjusting member 96 moves in an axial direction of the fixing hole 69, the second shaft 94 moves within the adjusting hole 68 to drive the hanger 40 to rotate around the first shaft 92.

The adjusting member 96 includes a threaded rod 91, a smooth rod 93 located at one end of the threaded rod 91, and an operating portion 95 at the other end of the threaded rod 91. The fixing hole 69 is a threaded hole. The threaded rod 91 is movably fixed in the threaded hole, and the smooth rod 93 is fixed in the receiving hole 98. A step 97 is formed between the smooth rod 93 and the threaded rod 91. The step 97 abuts against the second shaft 94.

The hanger 40 includes a connecting member 42 and a frame body 44. The first shaft 92 is fixed to the two sliding rods 60. The connecting member 42 is fixed to the frame body 44 and is rotatably fixed to the first shaft 92. The connecting member 42 includes two connecting pieces 46 disposed on two facing sides of the two sliding rods 60. The frame body 44 includes two fixing pieces 48 disposed on opposite sides of the two sliding rods 60. Each connecting piece 46 defines a first positioning hole 50. Each fixing piece 48 defines a second positioning hole 52. The second shaft 94 is disposed in the first positioning hole 50, the adjusting hole 68, and the second positioning hole 52 and is fixed to the fixing piece 48 and the connecting piece 46 by a nut 54.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A displayer elevating device comprising:
    a fixing frame comprising two fixing rods spaced apart from each other and a base connected to the two fixing rods;
    a hanger for fixing a displayer;
    two sliding rods connected to the hanger and slidably fixed to the two fixing rods;
    a connecting seat fixed between the two sliding rods;
    a screw rod fixed on the base;
    a driving device fixed on the connecting seat and slidably connected to the screw rod, the driving device moves along the screw rod to drive the two sliding rods to slide along the two fixing rods;
    a first shaft;
    two second shafts; and
    two adjusting members,
    wherein the hanger is rotatably connected to the two sliding rods via the first shaft, each sliding rod defines an adjusting hole and a fixing hole, each second shaft defines a receiving hole, each second shaft is fixed to the hanger and is movably disposed in one of the adjusting holes, one end of the adjusting member passes through one of the fixing holes and is fixed in one of the receiving holes, when the two adjusting members move in an axial direction of the fixing hole, the two second shafts move within two adjusting holes to drive the hanger to rotate around the first shaft.

2. The displayer elevating device as claimed in claim 1, wherein the driving device is a lifting hand wheel, the lifting hand wheel comprises a rotating wheel, a worm fixed to the rotating wheel and a first worm gear meshing with the worm; the first worm gear is sleeved on the screw rod and screwed with the screw rod.

3. The displayer elevating device as claimed in claim 1, wherein base comprises at least three universal casters.

4. The displayer elevating device as claimed in claim 1, wherein each fixing rod defines a sliding slot, two sliding slots of the two fixing rods faces each other, the two sliding rods are slidably disposed in the two sliding slots.

5. The displayer elevating device as claimed in claim 4, wherein each sliding slots comprises a first sliding slot and a second sliding slot communicating with the first sliding slot, each sliding rod comprises a rod body and a plurality of rollers fixed to the rod body, the rod body is disposed in the first sliding slot, and the plurality of rollers disposed in the second sliding slot, a diameter of each roller is smaller than a width of the rod body.

6. The displayer elevating device as claimed in claim 5, wherein two ribs protrude from opposite edges of each first sliding slot, each rod body defines two guiding grooves on opposite sides of the rod body, the two ribs are each slidably disposed in one guiding groove.

7. The displayer elevating device as claimed in claim 1, wherein the adjusting member comprises a threaded rod, a smooth rod located at one end of the threaded rod, and an operating portion at the other end of the threaded rod, the fixing hole is a threaded hole, the threaded rod is movably fixed in the threaded hole, and the smooth rod is fixed in the receiving hole, a step is formed between the smooth rod and the threaded rod, the step abuts against the second shaft.

8. The displayer elevating device as claimed in claim 1, wherein the hanger comprises a connecting member and a frame body, the first shaft is fixed to the two sliding rods, the connecting member is fixed to the frame body and is rotatably fixed to the first shaft.

9. The displayer elevating device as claimed in claim 8, wherein the frame body comprises two fixing pieces disposed on opposite sides of the two sliding rods, the connecting member comprises two connecting pieces, each connecting piece defines a first positioning hole, each fixing piece defines a second positioning hole, the second shaft is disposed in the first positioning hole, the adjusting hole, and the second positioning hole and is fixed to the fixing piece and the connecting piece by a nut.

* * * * *